(12) United States Patent
Abramov et al.

(10) Patent No.: US 8,465,652 B2
(45) Date of Patent: Jun. 18, 2013

(54) METHOD FOR DISINFECTING SEWAGE SLUDGE

(75) Inventors: Yakov Kuzmich Abramov, Moscow (RU); Vladimir Mihailovich Veselov, Moscow (RU); Viktor Mihailovich Zalevsky, Moscow (RU); Vitaly Grigorevich Tamurka, Moscow (RU); Nikolay Dmitrievich Argunov, Moscow (RU); Ljubov' Viktorovna Motovilova, Malakhovka (RU); Nikolay Vladimirovich Dvoryaninov, Moskovskaja obl. (RU); Lidija Petrovna Bogdanova, g. Vidnoe (RU)

(73) Assignee: Twin Trading Company, Moscow (RU)

( * ) Notice: Subject to any disclaimer, the term of this patent is extended or adjusted under 35 U.S.C. 154(b) by 0 days.

(21) Appl. No.: 13/517,058

(22) PCT Filed: Dec. 16, 2010

(86) PCT No.: PCT/RU2010/000763
§ 371 (c)(1),
(2), (4) Date: Jun. 19, 2012

(87) PCT Pub. No.: WO2011/078742
PCT Pub. Date: Jun. 30, 2011

(65) Prior Publication Data
US 2012/0248044 A1    Oct. 4, 2012

(30) Foreign Application Priority Data

Dec. 25, 2009   (RU) ................................ 2009148221

(51) Int. Cl.
*C02F 11/00*    (2006.01)
(52) U.S. Cl.
USPC ............... 210/748.03; 210/748.01; 210/764; 422/1; 422/33; 422/39; 4/300; 4/321; 4/420; 4/431

(58) Field of Classification Search
USPC ................... 210/748.01, 764, 748.03; 422/1, 422/33, 39; 4/300, 304, 321, 420, 431; 137/455, 137/485, 488; 417/65, 118, 148
See application file for complete search history.

(56) References Cited

U.S. PATENT DOCUMENTS

| | | | | |
|---|---|---|---|---|
| 5,429,750 A | * | 7/1995 | Steele | 405/129.25 |
| 5,527,508 A | * | 6/1996 | Childers et al. | 422/33 |
| 2006/0213561 A1 | * | 9/2006 | Tiwet | 137/488 |

FOREIGN PATENT DOCUMENTS

| | | |
|---|---|---|
| FR | 2120421 | 3/1982 |
| RU | 2015633 | 7/1994 |
| RU | 2031086 | 3/1995 |
| RU | 95102205 A1 | 4/1996 |
| RU | 2075198 | 3/1997 |
| RU | 2120421 | 10/1998 |
| SU | 842057 | 6/1981 |
| SU | 1330081 | 8/1987 |

OTHER PUBLICATIONS

International Search Report PCT/RU2010/000763.

* cited by examiner

*Primary Examiner* — Joseph Drodge
*Assistant Examiner* — Cameron J Allen
(74) *Attorney, Agent, or Firm* — Yefim Kreydin

(57) ABSTRACT

The invention relates to a technique of disinfecting household and industrial waste water used as the basis of organo-mineral fertilizers. The present method of disinfection is carried out by means of quick vacuum-pulse actions on sewage sludge using a receiver and quick response valves, with a pulse duration of less than 1.0 seconds at a pressure of not more than 20 mmHg to achieve the required degree of disinfection. Technical result of the use of the invention is to accelerate and simplify the process of disinfection method.

3 Claims, No Drawings

METHOD FOR DISINFECTING SEWAGE SLUDGE

This application is the United States national phase application of International Application PCT/RU2010/000763 filed Dec. 16, 2010, which claims the benefit of Russian Patent application No RU 2009148221 Filed Dec. 25, 2009, the entire disclosure of which is incorporated herein by reference.

BACKGROUND AND SUMMARY OF THE INVENTION

The present invention relates to a technique for disinfection of sludge of domestic and industrial wastewater used as the basis for organo-mineral fertilizers for agriculture.

A method of disinfection of sewage sludge is currently in use, which includes a preliminary dehydration of sludge, its granulation and heat treatment. The heat treatment is carried out in a fluidized bed in two stages, when using flue gases as heating medium supplied at a temperature of 200-400° C., at that at the first stage the temperature in the bed is maintained of 60-80° C. at a flow rate of fuel gases of 5-12 m/s, and at the second stage the temperature in the bed is maintained of 120-140° C., following which the granules are cooled, and to regulate and maintain the temperature the purified exhaust gases in the bed are used [Patent of RF No 2075198 CO2F 1/50].

The disadvantages of this method include high heating medium flow rate and the complexity of the process flow sheet.

A method of sewage sludge disinfection against causative microorganisms of parasitic diseases by means of the aerobic stabilization is currently in use. Into aerobic stabilizer with a humidity sludge of 94-95%, a solution of ovicidal preparation is added, which is made of gritted dried potato seedlings at the consumption rate of dry preparation of $0.001$-$0.1$ $g/m^3$ of sludge and the time of combined effect on helminth eggs by aerobic stabilization and the preparation for is at least 8 hours. [Patent of RF No 2120421 CO2F 11/00].

However, this method requires considerable time and is not efficient enough.

A method of sewage sludge disinfection is currently in use, while realizing this method the sludge from preliminary setting tanks and activated sludge following preliminary dehydration are mixed with adding material, sand and disinfecting agent (thiazone or ammonia aqua), are dehydrated additionally to the product of 60% humidity and disposed of as fertilizer [Certificate of authorship of the USSR No 842057 CO2F 11/00].

The disadvantage of this method is the use of thiazone or ammonia aqua as a disinfecting agent, which increases the cost of operations and makes the disposal products environmentally unsafe.

The closest analogue for the present invention is the following method of sewage sludge disinfection (waste), [Patent of RF No 2031086 CO2 F 11/18].

Waste to be disinfected are ground, mixed, loaded into a chamber and a sealed volume is created between a piston and the valve through which air is supplied under the pressure of 0.4-1.0 MPa for 1-5 minutes, and then a vacuum of 0.01-0.03 MPa is created for 1-6 minutes.

The disadvantage of this method is the duration of the disinfection process.

The method also places higher demands on equipment and automatic control system, which is associated with the use of pressure and the necessity to create alternating pressure and vacuum in the chamber.

In addition, the disinfection process is delayed due to the fact that before vacuum treatment operation it is necessary at first to bleed air being under pressure.

The aim of the present invention is to accelerate the process of disinfection of sludge of domestic and industrial wastewaters and simplification of the method in connection with the use of equipment with low strength and lower metal consumption.

The task to solve is achieved by that in the method of disinfection of sewage sludge are undergone by vacuum and the vacuum is produced by means of quick vacuum-impulse actions through a receiver, quick-response valves and pipelines with a pulse duration of less than 1.0 sec. and tinder residual pressure in the vacuum system not more than 20 mm Hg. to achieve the required degree of disinfection.

In the proposed method in a disinfection chamber the sewage sludge are subjected to quick vacuum-impulsive exposure which results in harsh decompression of the malignant bacteria that leads to their destruction and death. This allows creating a shortened time-consuming process of disinfection in comparison with the prior art. Moreover, the exclusion of excessive (high) pressure in the chamber makes it possible to use equipment of low strength and lower metal consumption. Also the necessity to "bleed" air being under pressure is excluded.

We have shown experimentally that only the conduction of the process of disinfection of sewage sludge in the claimed regime allows solving the problem of the invention.

Selecting of regimes of sewage sludge disinfection is determined experimentally to provide the necessary depth of disinfection in accordance with the requirements of the agrobiological standards and taking into account the capabilities of the current equipment.

DETAILED DESCRIPTION OF THE EXEMPLARY EMBODIMENTS

The proposed method of disinfection of sewage sludge is performed in the following manner.

Sewage sludge is placed in a disinfecting chamber, which is connected by pipelines with quick response valves with a receiver, quick vacuum-pulse exposure with a pulse duration of less than 1.0 sec. at a residual pressure in the chamber of disinfection is not greater than 20 mm Hg. are performed.

As shown by an experiment, the required degree of disinfection of sewage sludge is achieved within 10-15 sec.

Claimed method is confirmed by the experimental data.

The study results (see Table #1) of sewage sludge without prior disinfection showed the following points:

TABLE #1

| No | Defined indicators | Units | Study Results | Acceptable level value | Normative documents for study methods |
|---|---|---|---|---|---|
| | Microbiological studies | | | | |
| 1. | The index of coliforms* | cells g | 100,000 | 10 | LR FC/4022** |
| 2. | Index of enterococcus | cells g | 100,000 | 10 | LR FC/4022 |

Note:
*The index of coliforms—bacteria of E-coli;
**LR FC/4022—Legal requirements of the federal center.

The study results (see Table #2) of sewage sludge, disinfected by the present method (pulse duration 1.0 sec, the residual pressure in the chamber is of 15-20 mm Hg):

TABLE #2

| No | Defined indicators | Units | Study Results | Acceptable level value | Normative documentation for study methods |
|---|---|---|---|---|---|
| | | | Microbiological studies | | |
| 1. | The index of coliforms | cells/g | less than 10 | 10 | LR FC/4022 |
| 2. | Index of *enterococcus* | cells/g | less than 10 | 10 | LR FC/4022 |

As can be seen from a comparison of tabular data, the degree of disinfection is higher than $10^4$.

Thus, the present method makes it possible to accelerate the process, it is time-saving, reliable in quality of disinfection of sewage sludge, eliminates the necessity for additional equipment, and easy to use.

The invention claimed is;

1. A method of disinfection of sewage sludge, the method comprising:
   creating a vacuum to vacuum sewage sludge;
   the vacuuming of the sewage sludge is produced by high-speed vacuum—impulse action;
   wherein the pulse has a duration of not more than 1 second and a residual pressure is of not more than 20 mm Hg.

2. The method of disinfection of sewage sludge of claim 1 wherein a number of the high-speed vacuum—impulse is found till required degree of disinfection of the sewage sludge.

3. The method of disinfection of a sewage sludge of claim 1 wherein a number of the high-speed vacuum—impulse is found till destruction of microorganisms.

\* \* \* \* \*